US006983583B2

United States Patent
Bucher

(10) Patent No.: US 6,983,583 B2
(45) Date of Patent: Jan. 10, 2006

(54) LAWNMOWER TILT SENSOR APPARATUS AND METHOD

(75) Inventor: Corey W. Bucher, Wrightstown, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/781,454

(22) Filed: Feb. 18, 2004

(65) Prior Publication Data

US 2005/0108999 A1    May 26, 2005

Related U.S. Application Data

(60) Provisional application No. 60/524,087, filed on Nov. 21, 2003.

(51) Int. Cl.
   *A01D 75/28*     (2006.01)
(52) U.S. Cl. .................................. 56/10.2 R
(58) Field of Classification Search ............. 56/11.3, 56/10.5, 10.2 R, 10.2 D, 10.2 E, 10.3; 280/755; 172/4, 4.5, 7, 8; 33/366; 340/689
   See application file for complete search history.

(56) References Cited

U.S. PATENT DOCUMENTS

| 3,876,012 | A |   | 4/1975  | Regier |
| 3,885,112 | A | * | 5/1975  | Duncan ................. 200/61.44 |
| 3,969,875 | A | * | 7/1976  | Nofel ..................... 56/10.2 R |
| 4,554,535 | A | * | 11/1985 | Floris et al. ............... 340/689 |
| 4,558,760 | A |   | 12/1985 | Lestradet |
| 4,661,663 | A | * | 4/1987  | Weinheimer ............ 200/61.21 |
| 4,707,971 | A |   | 11/1987 | Forpahl et al. |
| 4,714,140 | A |   | 12/1987 | Hatton et al. |
| 4,779,406 | A | * | 10/1988 | Schroeder .................. 56/15.9 |
| 4,864,805 | A |   | 9/1989  | Hager et al. |
| 4,988,974 | A |   | 1/1991  | Fury et al. |
| 5,123,234 | A | * | 6/1992  | Harada et al. ........... 56/10.2 E |
| 5,176,391 | A |   | 1/1993  | Schneider et al. |
| 5,204,814 | A |   | 4/1993  | Noonan et al. |

(Continued)

FOREIGN PATENT DOCUMENTS

DE        3516582 A1 *  11/1986

OTHER PUBLICATIONS

Rebecca Day, www.popularmechanics.com, "Robots, Reinventing the Lawn Mower", Jan. 9, 2000.*

(Continued)

*Primary Examiner*—Thomas B. Will
*Assistant Examiner*—Alicia Torres
(74) *Attorney, Agent, or Firm*—Michael Best & Friedrich LLP

(57) ABSTRACT

A lawnmower comprising a frame, an engine supported by the frame, a mower deck supported by the frame, a rotating cutting blade disposed below the mower deck. A PTO is coupled to the engine and the cutting blade to rotationally drive the cutting blade. A drive system is connected to the frame and coupled to the engine to drive or propel the lawnmower. The lawnmower includes a tilt sensor for sensing a tilt angle representing the orientation of the lawnmower with respect to a horizontal level plane. An signal indicator may provide a notice signal when the tilt angle exceeds a pre-determined check angle. The PTO may be disengaged from the engine to stop rotation of the cutting blade when the tilt angle exceeds a pre-determined limit angle. The drive system generally remains operable to drive the lawnmower when the PTO is disengaged to stop rotation of the cutting blade.

27 Claims, 4 Drawing Sheets

U.S. PATENT DOCUMENTS

| | | | |
|---|---|---|---|
| 5,517,809 A | * | 5/1996 | Rich .............................. 56/2 |
| 5,540,037 A | | 7/1996 | Lamb et al. |
| 5,711,139 A | | 1/1998 | Swanson |
| 5,794,422 A | | 8/1998 | Reimers et al. |
| 5,934,051 A | | 8/1999 | Hahn |
| 5,995,895 A | * | 11/1999 | Watt et al. .................... 701/50 |
| 6,009,358 A | * | 12/1999 | Angott et al. ................. 701/25 |
| 6,026,920 A | | 2/2000 | Obeda et al. |
| 6,082,082 A | | 7/2000 | Hunter et al. |
| 6,082,084 A | | 7/2000 | Reimers et al. |
| 6,108,597 A | | 8/2000 | Kirchner et al. |
| 6,109,009 A | | 8/2000 | Benson |
| 6,198,992 B1 | | 3/2001 | Winslow |
| 6,339,916 B1 | | 1/2002 | Benson |
| 6,598,692 B2 | | 7/2003 | Angott |
| 6,604,348 B2 | | 8/2003 | Hunt |
| 6,611,738 B2 | | 8/2003 | Ruffner |
| 6,615,108 B1 | | 9/2003 | Peless et al. |

OTHER PUBLICATIONS

Pages 1-2 depicting the Spectrotilt™II Micro-50-Dual Axis Digital Inclinometer manufactured by Spectron Systems Technology Inc.

Pages 1-2 depicting the Electrolytic Tilt Sensors—RG and CG Series manufactured by Spectron Glass and Electronics Inc.

Description of the Durakool Tilt and Position Switches dated Nov. 17, 2003.

Page depicting the TAD II—Threshold Angle Detector by Spectron Systems Technology Inc.

Description of the Durakool Tip Over and Motion Switches dated Nov. 17, 2003.

Rieker Electronics Inc., SlopeAlert™, Tilt Warning System Specification Brochure, updated Dec. 2003.

* cited by examiner

LAWNMOWER TILT SENSOR APPARATUS AND METHOD

This Application claims the benefit of Provisional Application No. 60/524,087, filed Nov. 21, 2003.

FIELD OF THE INVENTION

This invention relates to a tilt sensor apparatus and method, and more particularly to a tilt sensor apparatus and method for a lawnmower.

BACKGROUND OF THE INVENTION

Power implements commonly include devices such as utility tractors, lawnmowers, landscaping equipment, trimmers, tillers, snow throwers, or other similar implements, and are used for general outdoor applications such as landscaping, gardening, lawn care, or snow removal. The implement may include at least one mechanism to perform the desired application. If the implement is self-propelled, the implement also includes a drive mechanism to propel the implement. For example, if the implement is a lawnmower, the lawnmower may include a drive mechanism, such as an engine and driven wheels, to propel the lawnmower across a surface, and a cutting blade to cut vegetation.

SUMMARY OF THE INVENTION

The present invention provides a riding lawnmower comprising a frame, an engine supported by the frame, a mower deck supported by the frame, a rotating cutting blade disposed below the mower deck. A Power Take-Off, or PTO, is coupled to the engine and the rotating cutting blade to rotationally drive the cutting blade. A drive system is connected to the frame and coupled to the engine to drive or propel the lawnmower. The lawnmower includes a tilt sensor for sensing a tilt angle representing the orientation of the lawnmower with respect to a horizontal level plane. The PTO may be disengaged from the engine to stop rotation of the cutting blade when the tilt angle exceeds a pre-determined limit angle. The drive system generally remains operable to drive the lawnmower when the PTO is disengaged to stop rotation of the cutting blade.

In some aspects and in some constructions, the drive system includes two independently controlled drive wheels. The drive wheels may be driven either forward or in reverse and at varying speeds independent of one another. The independently controlled drive wheels may permit the lawnmower to be a zero-turn radius mower.

In some aspects and in some constructions, the tilt sensor may include a tip switch for providing the limit signal when the tilt angle exceeds the limit angle. Additionally, the tilt sensor may include two separate tip switches having different threshold angles for sensing the tilt angle. The tilt sensor may include a check switch for sensing when the tilt angle exceeds a check angle and a limit switch for sensing when the tilt angle exceeds a limit angle. In some aspects and in some constructions, the check angle may be about 10 degrees and the limit angle may be about 20 degrees. In some aspects and in some constructions, the tilt sensor may include an inclinometer for measuring the tilt angle and providing a numerical value representing the tilt angle.

In some aspects and in some constructions, the lawnmower may include a CPU coupled to the tilt sensor. The tilt sensor may provide a check signal to the CPU indicating that the check switch is closed when the tilt angle exceeds a pre-determined check angle. Additionally, the tilt sensor may provide a limit signal to the CPU indicating that the limit switch is closed when the tilt angle exceeds the limit angle. The limit angle is generally greater than the check angle.

In some aspects and in some constructions, the lawnmower may include a signal indicator providing a notice signal for the operator in response to the CPU receiving the check signal. The notice signal may be at least one of an audible signal and a visual signal. The signal indicator may include a speaker for providing the audible signal and a strobe light for providing the visual signal. In some aspects and in some constructions, the signal indicator provides the notice signal when the CPU continuously receives the check signal for at least a pre-determined period of time. The pre-determined period of time may be about 1 second.

In some aspects and in some constructions, the signal indicator may provide an additional notice signal when the CPU receives the limit signal. The PTO may also disengaging from the engine to stop rotation of the cutting blade when the CPU continuously receives the limit signal for at least a second pre-determined period of time. The second pre-determined period of time may be about 5 seconds.

In some aspects and in some constructions, the CPU includes a memory or a storage device coupled to the CPU for recording the disengagement of the PTO. The memory may also be coupled to a clock to provide date and/or information corresponding to the disengagement of the PTO.

Other features and advantages of the present invention will become apparent to those skilled in the art upon review of the following detailed description and drawings.

Figure 1:
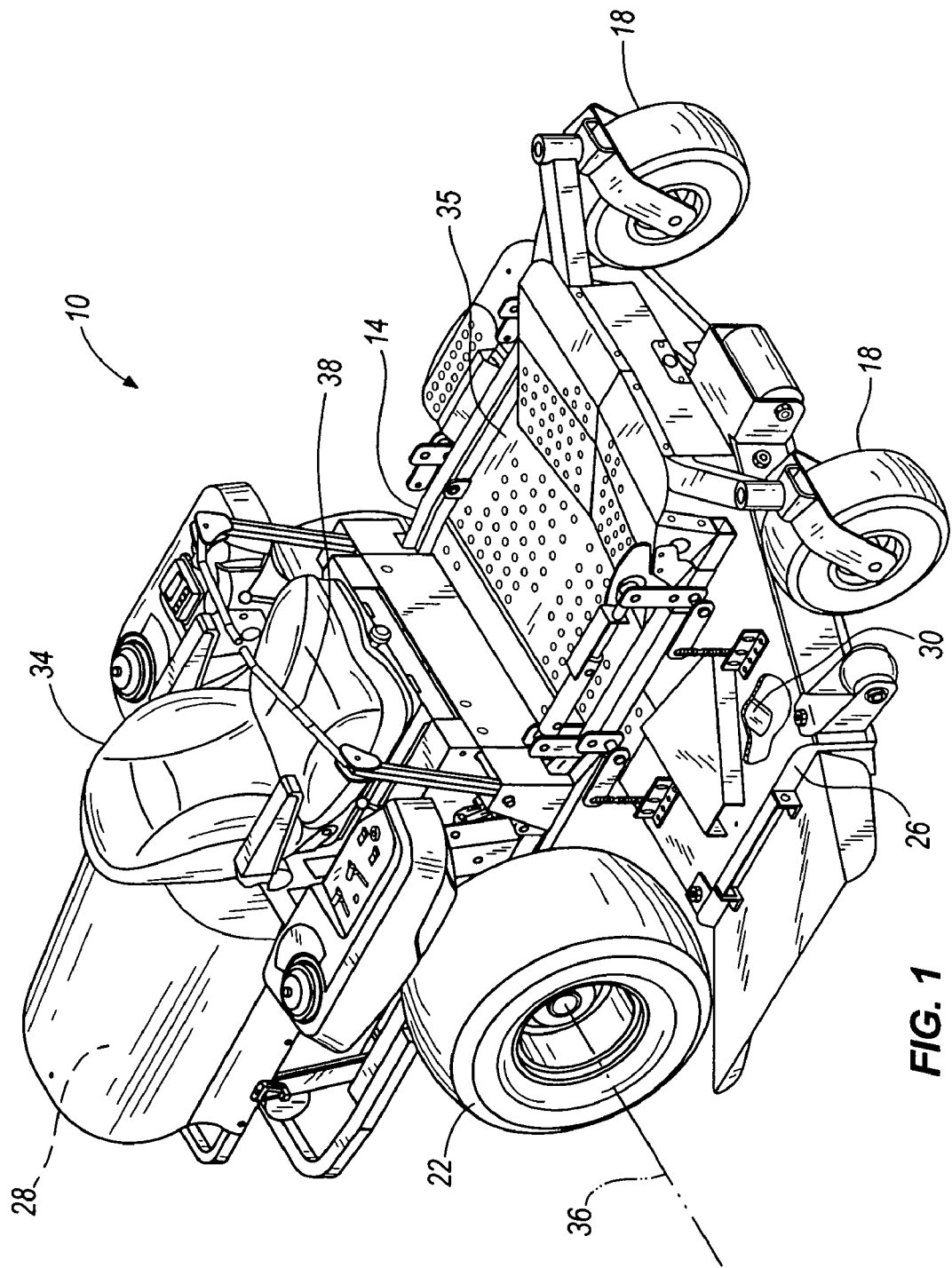
FIG. 1 shows a perspective view of a lawnmower having a tilt sensor embodying aspects of the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a lawnmower 10 including a frame 14, front wheels 18 and rear wheels 22 supporting the frame 14, a mower deck 26 supported by the frame 14, an engine 28 supported by the frame 14, a cutting blade 30 disposed under the mower deck 26 and driven by the engine 28. As shown in FIG. 1, the cutting blade 30 is normally obscured from view, but is illustrated through a cut-away portion of the mower deck 26. The engine 28 may be enclosed within a housing, as shown in FIG. 1. The lawnmower may also include a seat 34 supported by the frame 14 on which an operator may sit and a foot board 35 supported by the frame 14 for supporting an operator's feet. In the illustrated construction, the two rear wheels 22 may be coupled on a single axle and may both rotate about the same rotational axis 36.

In FIG. 1, the lawnmower 10 is a self-propelled riding lawnmower including a drive system connected to the frame 14 and coupled to the engine 28 for driving the lawnmower 10. The drive system includes two independently controlled drive wheels rotationally driven by the engine 28. As shown in FIG. 1, drive wheels of the drive system include the rear wheels 22 of the lawnmower 10. The drive system may include a transmission to direct the power from the engine to drive the drive wheels 22 in a forward or reverse direction.

In the illustrated construction, the lawnmower 10 is a belly-mount zero turn radius mower having a pair of control levers 38 for the independent forward and reverse operation of the drive wheels. The lawnmower 10 may be considered a "transteer" lawnmower and each control lever 38 independently controls the corresponding drive wheel 22 on the respective side of the lawnmower 10. The lawnmower 10 utilizes the independent drive wheels 22 to both propel the lawnmower 10 and steer the lawnmower 10. For example, to make a soft right turn, the lawnmower 10 may rotate the left wheel in a forward direction relatively faster than the right wheel. To make a hard right turn, the lawnmower 10 may rotate the left wheel in a forward direction while stopping the right wheel. To make a zero-radius right turn, the lawnmower 10 may rotate the left wheel in a forward direction while rotating the right wheel in a reverse direction. Therefore, the lawnmower 10 the power transferred to the drive system is also used to steer the lawnmower 10. The invention is not limited to the illustrated lawnmower 10 and may alternatively be embodied in other lawnmowers, such as a front mount mower or even other similar power implements.

Figure 2:
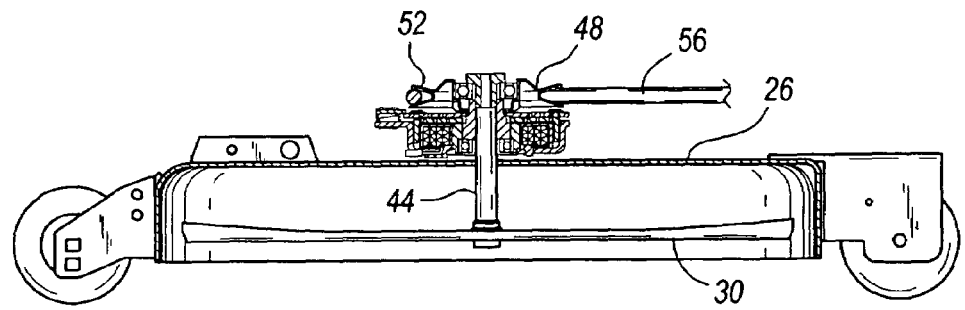
FIG. 2 shows a cross-sectional view of a portion of the lawnmower of FIG. 1.

FIG. 2 illustrates a partial cross-sectional view of the cutting blade 30 disposed below the mower deck 26. A shaft 44 extends through an opening in the mower deck 26, and the mower blade 30 is connected to an end of the shaft 44. As shown in FIG. 2, a Power Take-Off (PTO) 48 is coupled to the end of the shaft 44 opposite the cutting blade 30. The PTO 48 may be mounted to the mower deck 26. The PTO 48 is coupled to the engine and the rotating cutting blade 30 and at least partially transfers rotational power from the engine to the cutting blade 30 to rotationally drive the cutting blade 30. The PTO 48 may be selectively engaged or disengaged to control the transfer of power from the engine to the cutting blade 30 and regulate rotation of the cutting blade 30. In the illustrated construction, the PTO 48 includes an electric clutch and brake. The PTO 48 may include a pulley 52 that may be coupled to the engine with a belt 56 using a belt-and-pulley system. Other similar systems may be used to transfer rotational power from the engine to the PTO 48, such as a gearing system, a chain-and-sprocket system, a direct shaft, or other similar systems. The PTO 48 may regulate the rotational power transferred from the input, or pulley 52, to the output, or shaft 44. The PTO 48 may be controlled electronically to engage or disengage the electric clutch.

Figure 3:
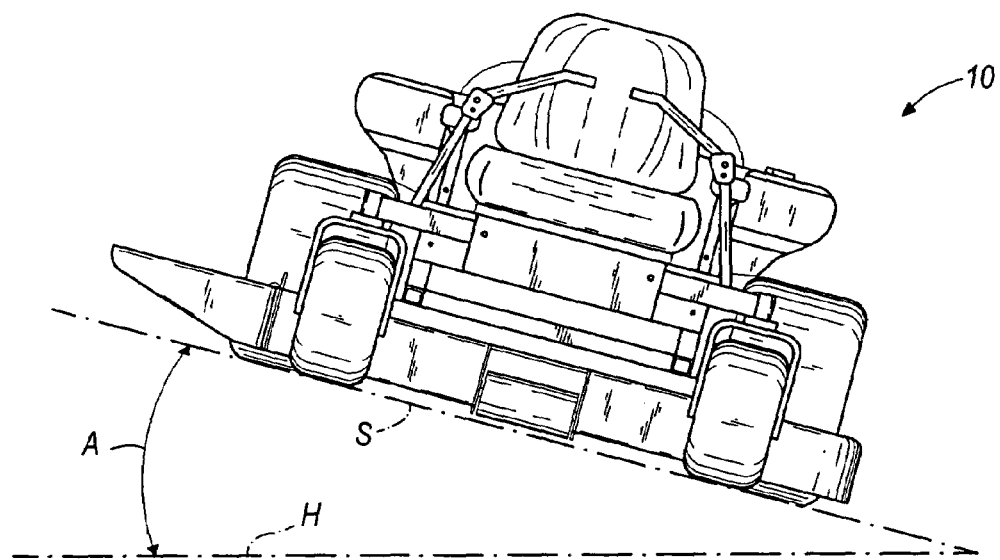
FIG. 3 shows a front view of the lawnmower of FIG. 1.

The lawnmower 10, as shown in FIG. 1, is generally driven on an off-road surface to cut vegetation, such as grass. Due to the off-road usage of the lawnmower 10, the lawnmower 10 may encounter uneven terrain and may be operated on a hill or slope. FIG. 3 illustrates the lawnmower 10 positioned on a slope being tilted from a horizontal plane.

The position of the lawnmower 10 may define a tilt angle representing the orientation of the lawnmower 10 with respect to a horizontal plane. The tilt angle is generally zero when the lawnmower 10 is on a flat level horizontal surface. While the lawnmower 10 is designed to be stable, operating the lawnmower 10 on extremely steep slopes beyond the intended range of use may present an unsafe operating condition. The lawnmower 10 may include a control unit 60 that senses the tilt angle and helps reduce the likelihood of an operator unknowingly encountering an unsafe operating condition on a hill or slope. As shown in FIGS. 1 and 3, the control unit 60 may be connected to the lawnmower 10 near the seat 34.

Figure 4:
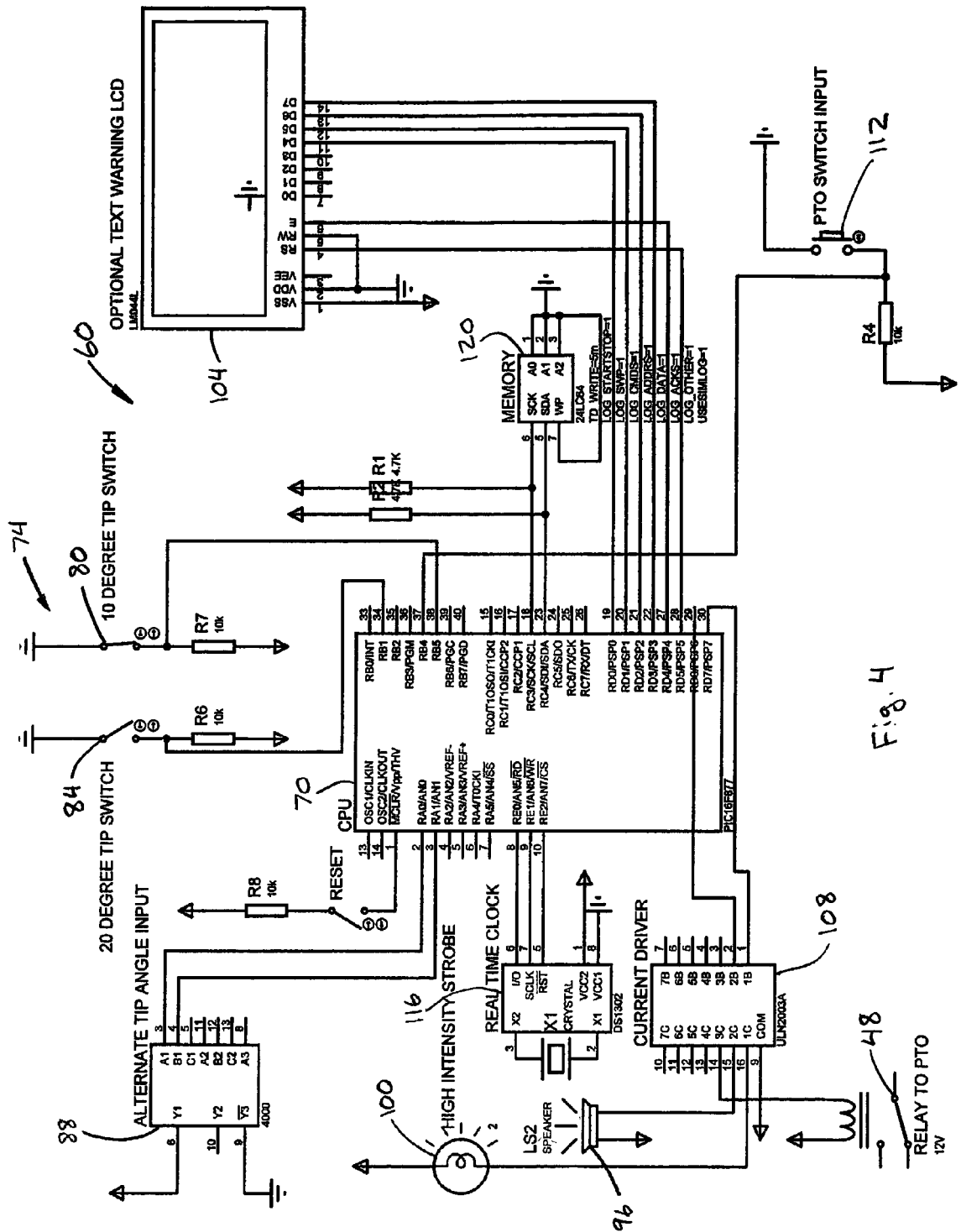
FIG. 4 illustrates a system block diagram of a control unit according to aspects of the present invention.

FIG. 4 illustrates a circuit diagram representing the control unit 60. The control unit 60 includes a CPU or processing module 70 and a tilt sensor 74 coupled to the CPU 70. The tilt sensor 74 senses a tilt angle representing the tilt of the lawnmower 10 relative to a horizontal plane. For example, the tilt sensor 74 is set to be about zero degrees when the lawnmower 10 is on a horizontal level surface. When the lawnmower 10 is driven on a hill or slope that is not horizontal, the tilt sensor 74 will sense that the lawnmower is no longer horizontal and may determine the tilt angle representing the orientation of the lawnmower 10 with respect to a horizontal level plane. FIG. 3 illustrates an example of the lawnmower 10 on a slope S with the tilt angle A representing the orientation of the lawnmower 10 with respect to the horizontal plane H.

In some aspects and in some constructions, the tilt sensors 74 may include tip switches and/or inclinometers to sense the tilt angle and provide an input for the control unit 60. A tip switch is generally an on or off switch and is activated and turned on when the tilt angle reaches a maximum threshold angle or trigger angle. A tip switch may sense whether the tilt angle is greater than or less than a certain angle, depending if the switch is on or off, but does not measure the exact tilt angle. An inclinometer generally measures the tilt angle and provides a numerical value representing the tilt angle. For example, a tip switch may sense that the tilt angle is greater than 10 degrees, and an inclinometer may indicate that the tilt angle is about 13 degrees.

As shown in FIG. 4, the tilt sensor 74 has two tip switches including a check switch 80 and a limit switch 84. An example of a suitable tip switch includes the TAD II—Threshold Angle Detector made by Spectron Systems Technology Inc. of Hauppauge, N.Y. The tip switches 80, 84 function as electronic switches that are activated when the tilt of the switch with respect to a horizontal plane reaches a trigger angle. The check and limit switches 80, 84 may be substantially the same, but may be set with different pre-determined threshold or trigger angles. The activation of the tip switch may provide a signal to the CPU 70 that the switch has reached its trigger angle or threshold angle. The tip switches are generally mounted in a horizontal plane and may read the tilt angle along all angle orientations. For example, the tip switches 80, 84 read both the pitch and the roll of the sensor and may determine the overall tilt angle of the sensor based on the pitch and roll values.

The tip switches 80, 84 may be set for a range of pre-determined trigger angles or threshold angles. The TAD II—Threshold Angle Detector, described above, provides a threshold range of about 0.2 degrees to 40 degrees. In this disclosure, the trigger angle for the check switch 80 is referenced as the check angle, and the trigger angle for the limit switch 84 is referenced as the limit angle. For example, the check switch 80 will be activated and turned on when the tilt angle reaches the check angle, and the limit switch 84 will be activated and turned on when the tilt angle reaches the limit angle. In the illustrated construction, the check switch 80 may be set with a check angle of about 10 degrees, and the limit switch 84 may be set with a limit angle of about 20 degrees. These values may be selected based on various features of the lawnmower 10 that may influence stability. For example, the wheel base, height, weight, center of gravity, seat location, weight of the operator, and other similar features may influence stability and may be considered when selecting the trigger angles.

As shown in FIG. 4, the check switch 80 is on or closed, indicating that the tilt angle exceeds the check angle. The check switch 80 provides a check signal to the CPU 70 indicating that the tilt angle exceeds the check angle, or the threshold angle for the check switch 80. In FIG. 4, the limit switch 84 is off or open, indicating that the tilt angle is below the limit angle. If the tilt angle exceeds the limit angle, the limit switch 84 closes and provide a limit signal to the CPU 70 indicating that the tilt angle exceeds the limit angle. In some aspects and in some constructions, the control unit 60 may include only a single tip switch.

FIG. 4 also illustrates an inclinometer 88, or tip angle input device, for measuring the tilt angle and providing an input to the CPU 70 indicating the tilt angle. In some aspects and in some constructions, the tilt sensor 74 may include the inclinometer 88 instead of the tip switches 80, 84. The inclinometer 88 may also be used together with the tip switches 80, 84. The inclinometer 88 measures the tilt angle representing the orientation of the lawnmower 10 with respect to a horizontal level plane and provides the tilt angle data to the CPU 70. The CPU 70 may analyze the tilt angle and determine if the tilt angle exceeds the pre-determined check angle and/or limit angle. An example of a suitable inclinometer includes the Spectrotilt™ II Micro-50 Dual Axis Digital Inclinometer made by Spectron Systems Technology Inc. of Hauppauge, N.Y.

The control unit 60 also includes an output device for alerting the operator. If the tilt angle exceeds the check angle and the CPU 70 receives the check signal, the CPU 70 may automatically activate an output device. The output device of the control unit 60 may include a signal indicator or a signal module providing a notice signal including at least one of an audible signal and a visual signal. In the illustrated construction, the signal indicator or signal module may include a speaker 96 for providing an audible signal and/or a strobe light 100 for providing a visual signal. The control unit 60 may use just the speaker 96, just the strobe light 100, both the speaker 96 and the strobe light 100, multiple speakers 96, multiple strobe lights 100, or other various combinations of the speaker 96 and the strobe light 100. FIG. 4 also illustrates a LCD display screen 104 that may provide messages for the operator. The screen may be used to provide the notice signal. The control unit 60 may also include an input keypad permitting user interface with the control unit 60.

As shown in FIG. 4, the control unit 60 also includes a current driver 108 coupled to the CPU 70 and the PTO 48. The current driver 108 may be activated by the CPU 70 to engage or disengage the PTO 48. As described above, the PTO 48 controls rotation of the cutting blade 30 (FIG. 2), and is electrically controlled by the CPU 70. The control unit 60 also includes a PTO input switch 112 that senses when the PTO 48 is engaged or disengaged. The PTO input switch 112 is coupled to the CPU 70 and provides an input to the CPU 70 to indicate whether the PTO 48 is engaged or disengaged.

FIG. 4 also illustrates a clock 116 and a memory or storage device 120 coupled to the CPU 70. The clock 116 may provide time information to the CPU 70, such as date, time of day, and duration of various events. The memory 120 saves data input from the CPU 70 and may record the occurrence of various events, such as the CPU 70 receiving signals, providing signals, the tilt angle, the activation of the speaker 96 and/or strobe light 100, an input from the PTO input switch 112, the disengagement or engagement of the PTO 48, or other similar events. The memory 120 may also save the information or data received from the clock 116 to indicate time and date information for when a specific event occurred and the duration of the event.

Figure 5:
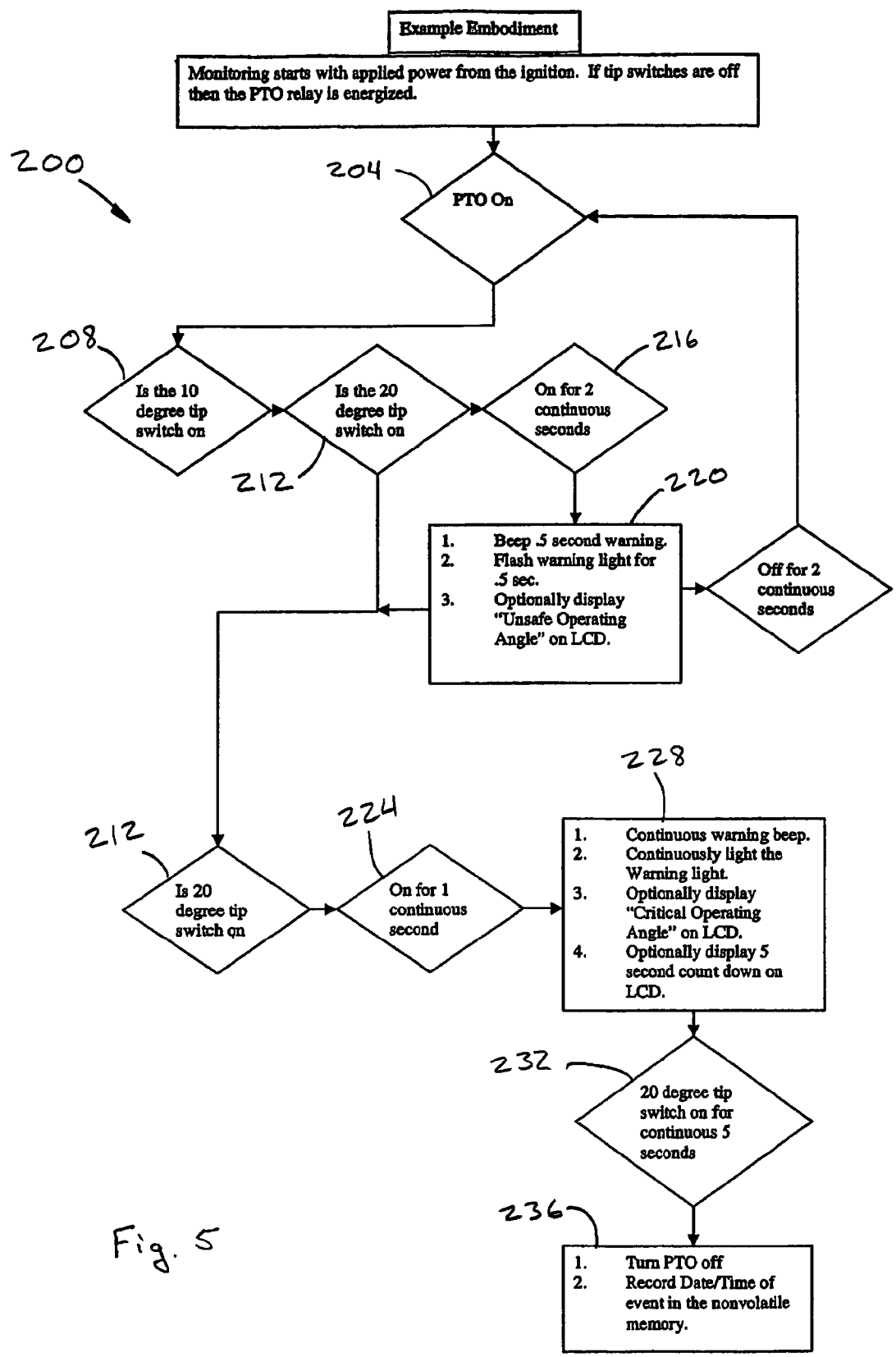
FIG. 5 illustrates an operational flow diagram of the system in FIG. 4 according to aspects of the present invention.

FIG. 5 illustrates an operational flow diagram 200 of the control unit 60 and lawnmower 10 outlining one example of the control unit 60 sensing the tilt angle of the lawnmower 10. The control unit 60 begins monitoring the lawnmower 10 when the ignition of the lawnmower 10 is turned on. If the tilt angle is less than a pre-determined check angle and the tip switches 80, 84 are off or open, the PTO 48 may be energized and engaged to rotate the cutting blade 30. At step 204, the PTO input switch 112 senses if the PTO 48 is engaged or disengaged. If the PTO 48 is engaged, the control unit 60 checks if the tilt angle exceeds the check or limit angles. At step 208, the check switch 80 senses if the tilt angle exceeds the check angle. In the illustrated construction, the check angle is about 10 degrees. If the tilt angle does not exceed the check angle, the check switch 80 remains open or off and the control unit 60 continues to check the check switch 80. If the tilt angle does exceed the check angle, the check switch 80 is closed or off and the control unit 60 proceeds to step 212.

At step 212, the limit switch 84 senses if the tilt angle exceeds the limit angle. In the illustrated construction, the limit angle is about 20 degrees. If the tilt angle does not exceed the limit angle, the limit switch 84 remains open while the check switch 80 is closed and the control unit 60 proceeds to step 216. In step 216, the control unit 60 checks if the check switch 80 remains continuously closed for a pre-determined period of time. In the illustrated construction, the pre-determined period of time is about 2 continuous seconds. If the check switch 80 remains closed for about 2 continuous seconds, the control unit 60 proceeds to step 220.

Checking for the check switch 80 being closed for a continuous period of time provides a buffer and helps filter out false signals due to rough terrain. For example, if the lawnmower 10 briefly hits a bump, hole, or is somehow jarred, the lawnmower 10 may be temporarily tilted and the tilt angle may exceed the check angle due to the shock on the lawnmower 10. If the lawnmower 10 quickly returns to a level position the signal will not continue for the required period of time, and the control unit 60 will not proceed to the next step. The continuous signal check helps prevent false alarms for the operator.

At step 220, the signal indicator or signal module provides a notice signal for the operator. As described above, the notice signal may comprise an audible signal from the speaker 96, a visual signal from the strobe light 100, a message on the display screen 104, and/or some other similar signal to be perceived by the operator. The notice signal may be an intermittent signal, such as a beep or flash. If the tilt angle drops below the check angle and the check switch 80 returns to the open or off position for a pre-determined period of time, such as 2 continuous seconds, the control unit 60 returns to step 204 and restarts the sensing process. If the tilt angle remains above the check angle and the check switch 80 remains on, the control unit 60 again performs step 212.

As mentioned above, at step 212, the limit switch 84 senses if the tilt angle exceeds the limit angle. If the tilt angle does not exceed the limit angle, the limit switch 84 is open and the control unit returns to step 204. If the tilt angle exceeds the limit angle, the limit switch 84 is closed and the control unit 60 proceeds to step 224. At step 224, the control unit 60 checks if the limit switch 84 remains continuously closed for a pre-determined period of time, such as 1 continuous second. The control unit 60 will return to step 204 if the limit switch 84 does not remain on or closed for 1 continuous second, and will proceed to step 228 if the limit switch 84 does remain on or closed for 1 continuous second. Once again, checking for the limit switch 84 being closed for a continuous period of time provides a buffer and helps filter out false signals due to rough terrain.

At step 228, the signal indicator or signal module may provide an additional notice signal for the operator. The additional notice signal may also comprise an audible signal from the speaker 96, a visual signal from the strobe light 100, a message on the display screen 104, or some other similar signal to be perceived by the operator. The additional notice signal may be more conspicuous than the first notice signal to inform the operator that there has been a change in the tilt angle and allow the operator to differentiate between the notice signals. The additional notice signal may be a continuous signal, such as a continuous noise or light, while the first notice signal may be an intermittent signal, such as a flash or beep. The control unit 60 will then proceed to step 232 in which the control unit 60 checks if the limit switch 84 remains continuously closed for an additional pre-determined period of time, such as 5 continuous seconds. Checking the limit switch 84 for a continuous period of time provides the operator with an opportunity to steer the lawnmower 10 to more level terrain and avoid a potentially unsafe operating condition. If the control unit 60 senses that the limit switch 84 if off or open, the control unit 60 returns to step 204. If the control unit 60 senses that the limit switch 84 remains closed for 5 continuous seconds, the control unit 60 proceeds to step 236.

At step 236, the control unit 60 provides a signal to the PTO 48 to disengage the PTO 48 and stop rotation of the cutting blade 30. In some aspects and in some constructions, the control unit 60 may not provide an additional indicator signal and may skip step 228 and proceed directly to step 236 to disengage the PTO 48. The control unit 60 may record that the PTO 48 was disengaged and the corresponding date and/or time data in the memory 120 or storage device.

When the PTO 48 is disengaged due to the tilt angle exceeding the limit angle, power is cut to the cutting blades 30 to stop rotation, but power is still provided to the drive system. The drive system remains operable to drive the lawnmower 10 when the PTO 48 is disengaged. Maintaining power to the drive system is helpful when the lawnmower 10 is zero-radius turn mower having two independently controlled drive wheels 22. As described above, the drive system uses power to the drive wheels 22 to both propel the lawnmower 10 and steer the lawnmower 10. Maintaining power to the drive system permits the operator to steer the lawnmower 10 off the hill or slope to a more level terrain and decrease the tilt angle. Decreasing the tilt angle helps lessen the likelihood of an operator unknowingly encountering an unsafe operating condition. Therefore, the powered drive system helps the operator avoid a severe hill or slope.

The various pre-determined periods of time in which the control unit 60 checks for a continuous signal, such as 1, 2, or 5 seconds, may vary depending on features of the lawnmower 10. As described above, the stability of the lawnmower 10 may be influenced by various factors, such as the wheel base, height, weight, center of gravity, seat location, weight of the operator, and other similar features. The pre-determined period of time may be selected based on these other features that influence stability.

In some aspects and in some constructions, the control unit 60 may only include the limit switch 84 and may not have the check switch 80. In this construction, the control unit 60 may bypass steps 208, 216, and 220 and may proceed directly to step 212 to check if the limit switch 84 is on or off. Additionally, the control unit 60 may also bypass steps 228 and 232 and proceed directly to step 236 to disengage the PTO 48. The control unit 60 may also perform other combinations of the steps shown in FIG. 5.

The foregoing detailed description describes only a few of the many forms that the present invention can take, and should therefore be taken as illustrative rather than limiting. It is only the claims, including all equivalents that are intended to define the scope of the invention.

What is claimed is:

1. A riding lawnmower comprising:
   a frame;
   an engine supported by the frame;
   a mower deck supported by the frame;
   a rotating cutting blade disposed below the mower deck;
   a PTO coupling the engine and the rotating cutting blade to rotationally drive the cutting blade;
   a drive system connected to the frame and coupled to the engine for driving the lawnmower;
   a tilt sensor for sensing a tilt angle representing the orientation of the lawnmower with respect to a horizontal level plane, the PTO being disengaging from the engine to stop rotation of the cutting blade when the tilt angle exceeds a pre-determined limit angle, the drive system remaining operable to drive the lawnmower when the PTO is disengaged to stop rotation of the cutting blade;
   a CPU coupled to the tilt sensor, the tilt sensor providing a check signal to the CPU when the tilt angle exceeds a pre-determined check angle, the tilt sensor providing a limit signal to the CPU when the tilt angle exceeds the limit angle, the limit angle being greater than the check angle; and
   a signal indicator providing a notice signal being at least one of an audible signal and a visual signal in response to the CPU receiving the check signal.

2. The lawnmower of claim 1, wherein the signal indicator provides the notice signal when the CPU continuously receives the check signal for at least a pre-determined period of time.

3. The lawnmower of claim 2, wherein the pre-determined period of time is about 1 second.

4. The lawnmower of claim 1, wherein the signal indicator provides an additional notice signal when the CPU receives the limit signal, the PTO being disengaging from the engine to stop rotation of the cutting blade when the CPU continuously receives the limit signal for at least a second pre-determined period of time.

5. The lawnmower of claim 4, wherein the second pre-determined period of time is about 5 seconds.

6. The lawnmower of claim 1, wherein the CPU includes a memory for recording the disengagement of the PTO.

7. The lawnmower of claim 1, wherein the tilt sensor includes a check switch for providing the check signal when the tilt angle exceeds the check angle and a limit switch providing the limit signal when the tilt angle exceeds the limit angle.

8. The lawnmower of claim 1, wherein the signal indicator includes a speaker for providing the notice signal.

9. The lawnmower of claim 1, wherein the signal indicator includes a strobe light for providing the notice signal.

10. The lawnmower of claim 1, wherein the check angle is about 10 degrees.

11. The lawnmower of claim 1, wherein the limit angle is about 20 degrees.

12. A riding lawnmower comprising:
a frame;
an engine supported by the frame;
a mower deck supported by the frame;
a rotating cutting blade disposed below the mower deck;
a PTO coupling the engine and the rotating cutting blade to rotationally drive the cutting blade;
a drive system having two independently controlled drive wheels connected to the frame and coupled to the engine for driving the lawnmower;
a signal system comprising:
 a tilt sensor for sensing a tilt angle representing the orientation of the lawnmower with respect to a horizontal level plane, the tilt sensor providing a check signal when the tilt angle exceeds a pre-determined check angle and providing a limit signal when the tilt angle exceeds a pre-determined limit angle, the limit angle being greater than the check angle;
 a processing module coupled to the tilt sensor and being operable to receive the check and limit signals from the tilt sensor; and
 a signaling module coupled to the processing module for providing notice signal being at least one of an audible signal and a visual signal when the processing module continuously receives the check signal for at least a pre-determined period of time, the PTO being disengaging from the engine to stop rotation of the cutting blade when the processing module receives the limit signal, the drive system remaining operable to drive the lawnmower when the PTO is disengaged in response to the limit signal.

13. The lawnmower of claim 12, wherein the pre-determined period of time is about 1 second.

14. The lawnmower of claim 12, further comprising a storage device coupled to the processing module and being operable to record when the PTO is disengaged from the engine.

15. The lawnmower of claim 12, wherein the signaling module provides an additional notice signal when the processing module receives the limit signal, the PTO being disengaging from the engine to stop rotation of the cutting blade when the processing module continuously receives the limit signal for at least a second pre-determined period of time.

16. The lawnmower of claim 15, wherein the second pre-determined period of time is about 5 seconds.

17. The lawnmower of claim 12, wherein the tilt sensor includes a check switch providing the check signal when the tilt angle exceeds the check angle and a second tip switch providing the limit signal when the tilt angle exceeds the limit angle.

18. The lawnmower of claim 12, wherein the tilt sensor includes an inclinometer for measuring the tilt angle and providing a numerical value for the tilt angle.

19. The lawnmower of claim 12, wherein the signaling module includes a speaker for providing the notice signal.

20. The lawnmower of claim 12, wherein the signaling module includes a strobe light for providing the notice signal.

21. The lawnmower of claim 12, wherein the check angle is about 10 degrees and the limit angle is about 20 degrees.

22. A method of providing a signal for the operating angle of a lawnmower having a frame, an engine supported by the frame, a mower deck supported by the frame, a rotating cutting blade disposed below the mower deck and a PTO connecting the cutting blade and the engine and rotationally driving the cutting blade, and a drive system having two independently controlled drive wheels connected to the frame and rotationally driven by the engine for driving the lawnmower, the method comprising the acts of:
 measuring a tilt angle with a tilt sensor representing the orientation of the lawnmower with respect to a horizontal level plane;
 sending a check signal from the tilt sensor to a CPU when the tilt angle exceeds a pre-determined check angle;
 sending a limit signal from the tilt sensor to a CPU when the tilt angle exceeds a pre-determined limit angle, the limit angle being greater than the check angle;
 activating a notice signal being at least one of an audible signal and a visual signal when the CPU receives the check signal; and
 disengaging the PTO from the engine to stop rotation of the cutting blade when the CPU receives the limit signal, the drive system remaining operable to drive the lawnmower when the PTO is disengaged in response to the limit signal.

23. The method of claim 22, further comprising the act of logging the disengagement of the PTO in a storage device.

24. The method of claim 22, wherein the act of activating the notice signal further comprises activating the notice signal when the CPU continuously receives the check signal for at least a pre-determined period of time.

25. The lawnmower of claim 24, wherein the pre-determined period of time is about 1 second.

26. The method of claim 22, further comprising the act of activating an additional notice signal when the CPU receives the limit signal, the act of disengaging the PTO from the engine further comprising disengaging the PTO when the CPU continuously receives the limit signal for at least a second pre-determined period of time.

27. The lawnmower of claim 26, wherein the second pre-determined period of time is about 5 seconds.

* * * * *